United States Patent Office 3,496,780
Patented Feb. 24, 1970

3,496,780
ELECTROSTATIC SUSPENSION ARRANGEMENTS OF GYROSCOPE ROTORS
Noel Clavelloux and Jean Boursault, Paris, France, assignors to CSF—Compagnie Generale de Telegraphie Sans Fil, a corporation of France
Filed June 16, 1967, Ser. No. 646,693
Claims priority, application France, July 8, 1966, 68,736
Int. Cl. G01c 19/02
U.S. Cl. 74—5                                             4 Claims

ABSTRACT OF THE DISCLOSURE

A device for the electrostatic suspension of a gyroscope rotor in the form of a hollow metal sphere enclosed by groups of electrodes at an interval therefrom, comprising self-oscillating systems, associated with each of said groups, whose oscillatory circuits include, as a tuning capacitance, the capacitances between the electrodes of the associated group and the rotor and whose feedback loops include non-linear devices having electrical characteristics depending upon the frequency of oscillation of said self-oscillating systems.

---

Figure 1:
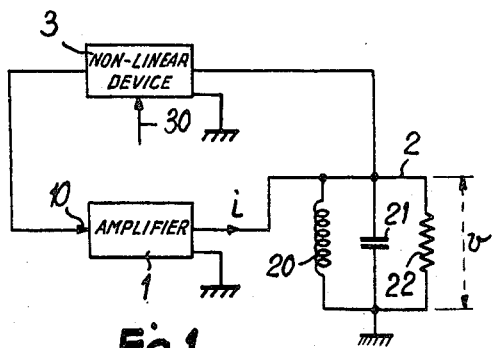

The present invention relates to an improvement in devices for the electrostatic suspension of rotors, in particular, gyroscope rotors, using a novel self-oscillating system in which the amplitude of the oscillations can be controlled.

A gyroscope of this kind comprises, generally, a rotor in the form of a hollow metal sphere and a hollow evacuated stator carrying electrodes which enclose said rotor at an interval therefrom. The rotor is suspended between the electrodes through the medium of forces produced by controlled electric fields developed between the electrodes and the rotor.

It is known to control electric fields of this kind by employing capacitance bridges or by using control arrangements based upon the phenomenon of resonance.

In the first case, the capacitances between the electrodes and the rotor along each axis of suspension, are included in a bridge by means of which the position of the rotor can be sensed and the voltages applied to each electrode controlled. However, a method of this kind necessitates complicated circuitry.

In the resonance method, the opposite rotor-electrode capacitances along an axis of suspension, are included in detuned resonance circuits. Any modification in these capacitances produces a corresponding modification in the degree of detuning of the resonance circuits and accordingly in the current passing across these capacitances. The circuits used are simple but, because the resonance circuits are detuned, present the drawback of a high power consumption and poor efficiency. On the other hand, it is difficult to achieve power damping in the control system since there is no quantity available which is proportional to the position of the rotor.

It is an object of this invention to overcome these drawbacks.

According to the invention there is provided a device for the electrostatic suspension of a gyroscope rotor, said rotor being in the form of a hollow metal sphere, said device comprising: a plurality of electrodes disposed by groups of $n$ electrodes on a plurality of axes of suspension, said electrodes enclosing said rotor at an interval therefrom; and self-oscillating systems respectively associated with said groups for generating an electrostatic field between each of said electrodes and said rotor, each of said systems including means for varying said fields, generated between the electrodes of said associated group and said rotor, as a function of the distances between said last mentioned electrodes and said rotor.

Figure 2:
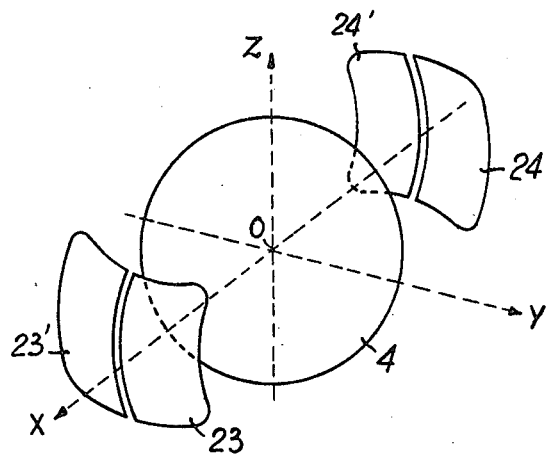
Figure 4:
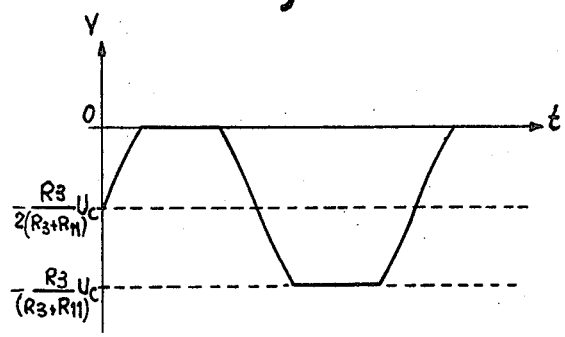
Figure 3:
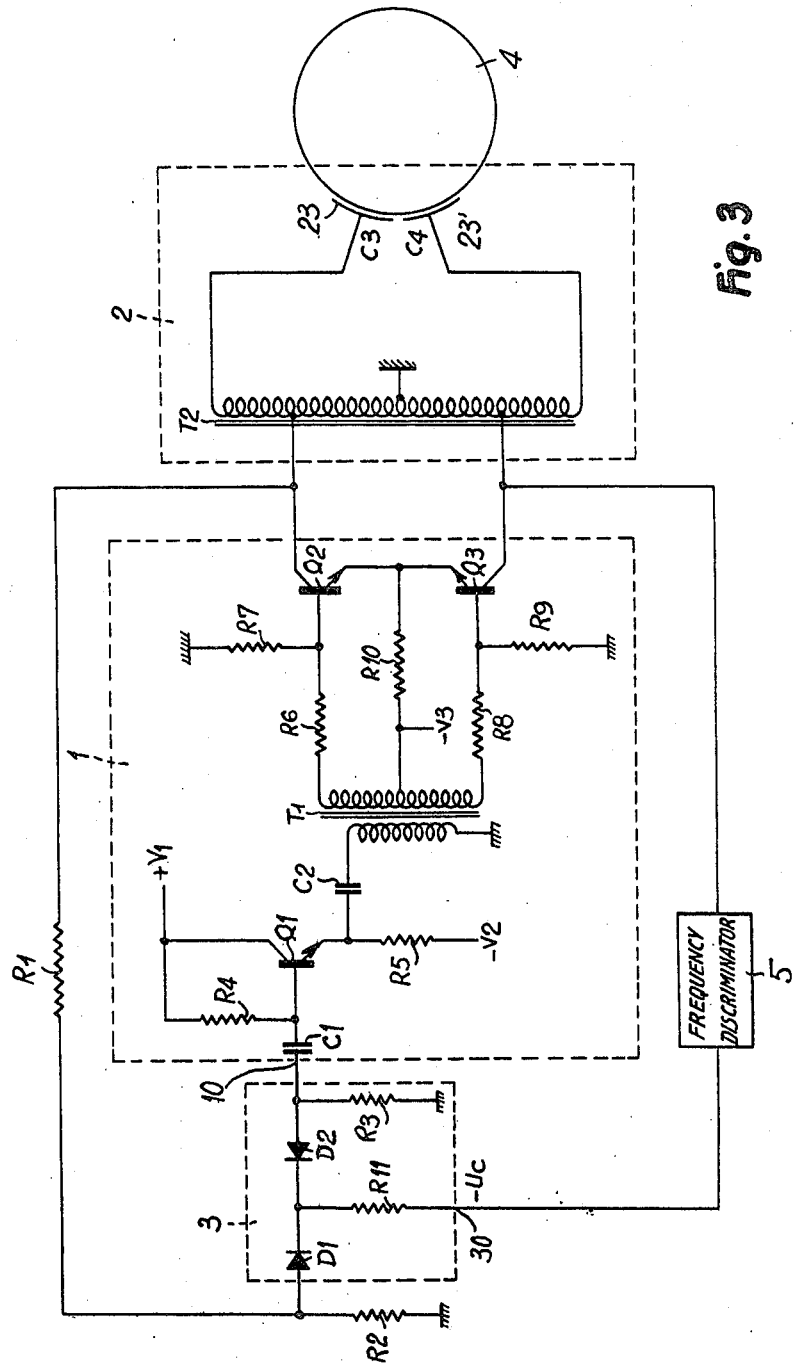

For a better understanding of the invention and to show how the same may be carried into effect reference will be made to the drawing accompanying the following description and wherein:

FIG. 1 illustrates the basic circuit diagram of the self-oscillating system used in accordance with the invention;

FIG. 2 schematically illustrates the disposition of the suspension electrodes in a gyroscope whose rotor is electrostatically suspended;

FIG. 3 illustrates diagrammatically an improved electrostatic suspension device in accordance with the invention; and FIG. 4 is an explanatory graph.

FIG. 1 illustrates the basic circuit diagram of a self-oscillating system which furnishes oscillations whose amplitude can be controlled. This circuit comprises an amplifier 1 connected to a grounded oscillatory circuit 2. The latter embodies the parallel arrangement of an inductor 20 of inductance L, a capacitor 21 of capacitance C and a resistor 22 of resistance R. A positive feedback circuit connects the oscillatory circuit 2 to the input 10 of the amplifier 1 through the medium of a non-linear device 3 provided with a control input 30. The operation is as follows:

The voltage across the terminals of the oscillatory circuit 2 is termed $v$ and the current injected into the circuit by the amplifier 1, whose gain is $\beta$, is termed $i$. The non-linear device 3, to whose input the voltage $v$ is supplied, produces an output voltage having the form $\alpha_1 v + \alpha_3 v^3$. The circuit illustrated can thus be defined by the equation:

$$C\frac{d^2v}{dt^2} + \frac{dv}{dt}\left[\frac{1}{R} - \beta(\alpha_1 + 3\alpha_3 v^2)\right] + \frac{v}{L} = 0$$

This shows that the self-oscillating system produces oscillations of stable amplitude if, $\alpha_1$ being positive, $\alpha_3$ is negative. On the other hand, if $\alpha_3$ is varied (using the control input 30), the amplitude of the voltage $v$ can be varied.

The frequency of oscillation is the frequency to which the circuit 2 is tuned, i.e.

$$f = \frac{1}{2\pi\sqrt{LC}}$$

A circuit of this kind is of particular interest in the field of application to electrostatic suspension devices for the rotors of gyroscopes. A gyroscope of this kind is illustrated very schematically in FIG. 2. The rotor 4 is constituted by a generally hollow metal sphere, suspended in the vacuum between electrodes.

In FIG. 2 two groups of electrodes for suspension purposes, situated on the X axis of a "dodecahedral" suspension system, have been illustrated. This system incorporates identical groups of electrodes (not shown) on the OY and OZ axes, O being the centre of the rotor. The two groups illustrated incorporate respectively identical electrodes 23, 23′ and 24, 24′. The spacing between these electrodes and the rotor has been exaggerated in order to make the drawing clear, but in actual fact it is very small indeed. Voltages are applied to the electrodes in order to create attraction forces which maintain the rotor in an equilibrium position.

If the rotor tends to approach more closely to one electrode, in order to return it to its equilibrium position, it is necessary to reduce the attractive force provided by this electrode, this force otherwise tending to increase as the spacing reduces.

In FIG. 3, the diagram of the improvement proposed in accordance with the invention to electrostatic rotor suspension devices, has been illustrated.

The capacitances $C_3$ and $C_4$, respectively existing between the rotor and the electrodes 23 and 23', are in series between the output terminals of an autotransformer $T_2$ whose centre is earthed. The input terminals of the autotransformer $T_2$ are connected to the collectors of two push-pull mounted transistors $Q_2$ and $Q_3$. The emitters of the transistors $Q_2$ and $Q_3$ are connected to one another and to a resistor $R_{10}$, whose other end is connected to the centre-tap of the secondary winding of a transformer $T_1$ and to a bias source $-V_3$. The bases of the transistors $Q_2$ and $Q_3$ are respectively connected to resistors $R_6$ and $R_8$, whose other ends are connected respectively to the ends of the secondary of the transformer $T_1$. Resistors $R_7$ and $R_9$ are connected respectively between the bases of the transistors $Q_2$ and $Q_3$, and earth.

The amplifier 1, in addition to the transistors $Q_2$ and $Q_3$, incorporates a transistor $Q_1$, whose emitter is connected, through a capacitor $C_2$, to one end of the primary of the transformer $T_1$. The other end of this primary winding is grounded. The emitter of the transistor $Q_1$ is also connected to a bias source $-V_2$, through a resistor $R_5$, and its collector is connected to a bias source $+V_1$.

The base of the transistor is connected to the input 10 of the amplifier 1 via a capacitor $C_1$ and to the source $+V_1$ via a resistor $R_4$. The positive feedback circuit incorporates a resistor $R_1$ connected to the collector of the transistor $Q_2$, in series with a resistor $R_2$ which is earthed. The non-linear device 3 is connected between the junction point of the resistors $R_1$ and $R_2$, and the input 10. The device 3 comprises two diodes $D_1$ and $D_2$ whose cathodes are interconnected. The anode of the diode $D_1$ is connected to the junction point between the resistors $R_1$ and $R_2$, whilst the anode of the diode $D_2$ is connected to the input 10 and, via the resistor $R_3$, to ground.

A resistor $R_{11}$ is connected between the control input 30 and the cathodes of the diodes $D_1$ and $D_2$. The control voltage $-U_c$ is furnished by a frequency discriminator 5 connected to the collector of the transistor $Q_3$.

The operation is as follows:

The capacitors $C_3$ and $C_4$ constitute the tuning capacitors in the oscillatory circuit 2, the inductance being that of the autotransformer $T_2$.

The transistors $Q_2$ and $Q_3$ form the power stage of the amplifier, the resistor $R_{10}$ ensuring a stable gain in this stage. The resistors $R_7$ and $R_9$ provide the bias for the transistors $Q_2$ and $Q_3$ into class AB operation, so that the self-oscillating system can start oscillating on its own.

The value of the non-linearity introduced into the positive feedback loop is controlled by the voltage $-U_c$ furnished by the discriminator 5. This voltage is proportional to the frequency of oscillation of the circuit, and therefore to the value of the capacitors $C_3$ and $C_4$, i.e. the voltage is a function of the position of the rotor in relation to the electrodes 23 and 23'. Calculation shows that for the device 3:

$$\alpha_1 = A(b_1 + 3b_3)$$
$$\alpha_3 = -Bb_3$$

with:

$$b_1 = \frac{2}{\pi}\left(\theta_L + \frac{\sin 2\theta_L}{2}\right)$$

$$b_3 = \frac{1}{3\pi}\left(\sin 2\theta_L + \frac{\sin 4\theta_L}{2}\right)$$

and:

$$\sin \theta_L = kU_c$$

A, B and $k$ are constants.

Therefore $\alpha_3$ is negative and varies with the voltage $U_c$. The amplitude of oscillation $v$ is therefore a true function of the position of the rotor.

The clipped voltage produced by the device 3 at the input 10 is illustrated in FIG. 4. Clipping is symmetrical if $$\frac{R_1 R_2}{R_1 + R_2} = \frac{R_3 R_{11}}{R_3 + R_{11}}$$

The discriminator 5 is adjusted to produce equilibrium in the rotor 4. If, for example, the rotor moves away from the electrodes 23 and 23', the capacitance $$\frac{C_3 C_4}{C_3 + C_4}$$

decreases and the frequency of oscillation rises. The voltage $-U_c$ thus becomes more negative and the amplitude $v$ of oscillation rises, this increasing the attractive force exerted by the electrodes 23 and 23' and counteracting the force which tends to move the rotor further away.

The improvement in accordance with the invention has the advantage of employing an independent circuit for each suspension electrode or electrode group. This yields a high degree of flexibility in the equilibrium position of the rotor.

The "dodecahedral" suspension system has the further advantage that in the equilibrium stage, $C_3$ and $C_4$ are substantially equal and the rotor is thus virtually earthed.

In one embodiment of the invention, the following elements were employed:

$R_1 = 33$ KΩ; $+V_1 = +12$ v.
$R_2 = 3.3$ KΩ; $-V_2 = -6$ v.
$R_3 = 6.8$ KΩ; $-V_3 = -100$ v.
$R_4 = 39$ KΩ; $T_1$ ratio of $$\frac{\text{primary}}{\frac{1}{2}\text{ secondary}} = 1$$

$R_5 = 470$Ω
$R_6 = 470$Ω; $T_2$ ratio of autotransformer$=20$
$R_7 = 82$ KΩ; $D_1$, $D_2$ 1N914
$R_8 = 470$Ω; $Q_1$ 2N2222
$R_9 = 82$ KΩ; $Q_2$, $Q_3$ 2N3739
$R_{10} = 39$Ω
$R_{11} = 6.8$ KΩ.

Of course, the embodiments described hereinbefore are in no way limitative of the scope of the invention and are given solely by way of example.

What is claimed is:

1. A device for the electrostatic suspension of a gyroscope rotor, said rotor being in the form of a hollow metal sphere, said device comprising: a plurality of electrodes disposed by groups of $n$ electrodes on a plurality of axes of suspension, $n$ being a positive integer, said electrodes enclosing said rotor at an interval therefrom; and self-oscillating systems respectively associated with said groups, each of said systems including (i) an oscillatory circuit having a capacitance which includes the capacitances between the electrodes of the associated group and said rotor, for generating, between each one of the electrodes of said associated group and said rotor, an electrostatic field whose average strength depends upon the amplitude of the oscillations in the considered system and (ii) means for controlling the amplitude of the oscillations in said circuit as a function of their frequency, thereby varying said average strength of the fields generated between the electrodes of said associated group and said rotor as a function of the distances between said last mentioned electrodes and said rotor.

2. A device as claimed in claim 1, wherein each of said self-oscillating systems comprises an amplifier having an output connected to said oscillatory circuit and an input and a positive feedback loop connected between said output and said input of said amplifier; said amplitude controlling means comprising: a variable non-linear device, inserted in said feedback loop, said non-linear device having a control input; and frequency responsive means connected between said output of said amplifier and said control input.

3. A device as claimed in claim 2, wherein said frequency-responsive means are a frequency discriminator.

4. A device as claimed in claim 3, wherein $n$ is equal to 2 and wherein said oscillatory circuit comprises an autotransformer having two output terminals and a centre tap, said centre tap being earthed and said output terminals being respectively connected to said two electrodes of said associated group, said two electrodes being identical.

References Cited

UNITED STATES PATENTS

| | | | |
|---|---|---|---|
| 3,003,356 | 10/1961 | Nordsieck | 74—5 |
| 3,098,679 | 7/1963 | De Boice | 308—8 |
| 3,295,379 | 1/1967 | Jensen et al. | 74—5 XR |
| 3,379,070 | 4/1968 | Spiegel | 74—5 |

FRED C. MATTERN, Jr., Primary Examiner

M. ANTONAKAS, Assistant Examiner

U.S. Cl. X.R.

74—5.7